G. W. GRIFFIN.
Scroll-Saw.
No. 210,421. Patented Dec. 3, 1878.
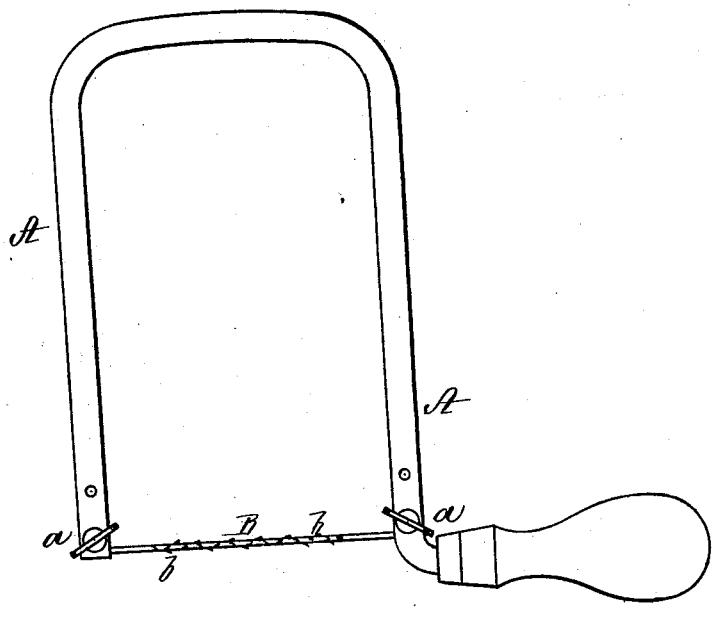
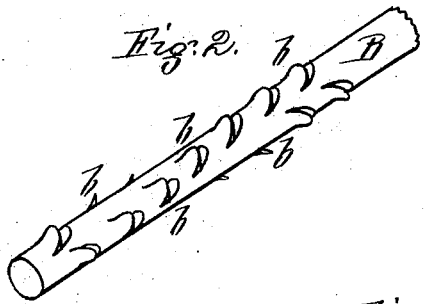
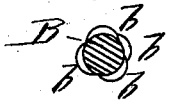
Witnesses,
W. J. Cambridge
J. E. Cambridge
Inventor,
George W. Griffin,
Per Teschemacher & Stearns,
Attorneys.

UNITED STATES PATENT OFFICE.

GEORGE W. GRIFFIN, OF FRANKLIN, NEW HAMPSHIRE, ASSIGNOR TO HIMSELF AND PARKER C. HANCOCK, OF SAME PLACE.

IMPROVEMENT IN SCROLL-SAWS.

Specification forming part of Letters Patent No. 210,421, dated December 3, 1878; application filed September 12, 1878.

*To all whom it may concern:*

Be it known that I, GEORGE W. GRIFFIN, of Franklin, in the county of Merrimack and State of New Hampshire, have invented an Improvement in Scroll-Saws, of which the following is a full, clear, and exact description, reference being had to the accompanying drawings, making part of this specification, in which—

Figure 1 is an elevation of a hand-frame having my improved saw applied thereto. Fig. 2 is a perspective view of a portion of the saw, enlarged. Fig. 3 is a longitudinal section through the center of the same. Fig. 4 is a transverse section on the line $xx$ of Fig. 3.

The object of my invention is to provide a cheap scroll-saw which will cut in any direction regardless of turning the saw-frame; and it consists (as a new article of manufacture) of a bar or wire provided with struck-up burr-teeth—that is to say, with teeth made by throwing up a portion of the surface of the metal in contradistinction to a tooth made by cutting away a portion of the stock.

To enable others skilled in the art to understand and use my invention, I will proceed to describe the manner in which I have carried it out.

In the said drawings, A represents an ordinary saw-frame, made of spring metal, between the clamps $a\,a$ of which is strained the saw B, which is composed of fine steel wire of circular form in cross-section. The teeth $b$ of this saw are cut spirally around it, at any desired distance apart, by means of a machine adapted for the purpose, each tooth being formed by a single stroke of the cutter, which raises a burr of the shape seen in Figs. 2 and 3, these teeth being arranged out of line with each other.

A saw constructed as above described, having teeth or burrs around it, will cut equally and uniformly on all sides, so that it may be operated by pressure in any direction to cause it to follow the line of the pattern without the necessity of turning the saw-frame A or moving the work upon the table when the saw is used in a machine operated by power, thus avoiding much of the inconvenience incident to the use of an ordinary scroll-saw. My improved saw cuts more rapidly than an ordinary saw and does not clog, as it frees itself more readily.

I prefer to cut the teeth spirally, as the stock is not thereby weakened to so great an extent, and I am thus enabled to use smaller or finer wire; but the teeth may be cut in parallel longitudinal rows, if desired, and the wire may be square or of other form in cross-section instead of round, as shown.

What I claim as my invention, and desire to secure by Letters Patent, is—

As a new article of manufacture, a flexible scroll-saw consisting of a wire of steel provided with struck-up burr-teeth on its surface to enable it to cut in all directions, substantially as described.

Witness my hand this 10th day of September, 1878.

GEORGE W. GRIFFIN.

In presence of—
P. E. TESCHEMACHER,
N. W. STEARNS.